United States Patent
Temple et al.

(10) Patent No.: US 9,516,817 B2
(45) Date of Patent: Dec. 13, 2016

(54) GRAIN-MOVING ARRANGEMENT FOR AN AGRICULTURAL COMBINE

(71) Applicant: DEERE & COMPANY, Moline, IL (US)

(72) Inventors: Douglas G. Temple, Fulton, IL (US); Lee W. Randall, Durant, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/669,948

(22) Filed: Mar. 26, 2015

(65) Prior Publication Data

US 2016/0278293 A1    Sep. 29, 2016

(51) Int. Cl.
*A01F 12/46*    (2006.01)

(52) U.S. Cl.
CPC ..................... *A01F 12/46* (2013.01)

(58) Field of Classification Search
CPC ............... A01F 12/46; A01D 17/04
USPC ......... 460/114, 116, 119; 198/541, 582, 586, 198/716, 725; 414/812, 813
See application file for complete search history.

(56) References Cited

U.S. PATENT DOCUMENTS

| | | | | |
|---|---|---|---|---|
| 3,147,850 | A * | 9/1964 | Ronceray | B65G 15/44 198/698 |
| 4,531,528 | A * | 7/1985 | Peters | A01F 12/44 460/97 |
| 4,587,799 | A * | 5/1986 | Thomas | A01D 45/30 56/126 |
| 4,800,902 | A * | 1/1989 | Maust | A01D 41/1208 460/114 |
| 5,863,247 | A * | 1/1999 | Behnke | A01D 41/1271 460/114 |
| 6,350,197 | B1 | 2/2002 | Cooksey et al. | |
| 7,040,980 | B1 | 5/2006 | Kestel | |
| 7,690,973 | B2 * | 4/2010 | Becker | A01F 12/46 460/114 |

FOREIGN PATENT DOCUMENTS

| | | |
|---|---|---|
| GB | 2224423 | 5/1990 |
| WO | 0158247 | 8/2001 |
| WO | 2015004268 | 1/2015 |

OTHER PUBLICATIONS

European Patent Office, Extended European Search Report in Application No. 16156897.7 dated Jul. 26, 2016.

* cited by examiner

*Primary Examiner* — John G Weiss
(74) *Attorney, Agent, or Firm* — Lorenz & Kopf, LLP (57) ABSTRACT

A grain-moving arrangement is disclosed for agricultural combines. An elevator is configured to move grain in a first direction along an elevator path, within an elevator housing, and to receive grain from a first auger at a first location on the elevator path. A grain-moving device is configured to receive power from the elevator in order to move grain received from a second auger in a second direction along a device path, within a device housing, to an outlet of the device housing. Grain moved along the device path to the outlet of the device housing passes through the outlet of the device housing to a second location on the elevator path that is upstream of the first location on the elevator path, with respect to the first direction.

16 Claims, 5 Drawing Sheets

GRAIN-MOVING ARRANGEMENT FOR AN AGRICULTURAL COMBINE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to agricultural combines, including arrangements for moving cleaned grain received from cleaning shoes of the agricultural combines.

BACKGROUND OF THE DISCLOSURE

Agricultural combines (or "combines") are large self-propelled machines that harvest and process crop material. Combines separate the crop material into cleaned grain (or other product), and other portions, and store the cleaned grain in a grain tank. In known configurations, an elevator may be used to move grain that has been cleaned by a cleaning shoe upward to the grain tank. The other portions of the crop material may be stored separately, or they may be spread across the ground.

Typically, agricultural combines are driven by internal combustion engines that propel the agricultural combine over the ground and drive a variety of crop processing devices. The internal combustion engine may be connected to these crop processing devices by belts and chains that connect pulleys and sprockets, respectively. For example, known elevators may be driven by a belt or chain that engages a pulley or sprocket of the elevators.

Improving the rate or efficiency of the grain-cleaning operations may be desirable, in order to generally improve the rate and efficiency of harvesting operations. Such improvement in cleaning rate or efficiency, however, may result in large volumes of grain that must be moved between different locations on the combine. For at least this reason, therefore, it may be useful to provide an improved arrangement for moving grain in a combine.

SUMMARY OF THE DISCLOSURE

A grain-moving arrangement is disclosed for an agricultural combine.

According to one aspect of the disclosure, an elevator is configured to move grain in a first direction along an elevator path, within an elevator housing, and to receive grain from a first auger at a first location on the elevator path. A grain-moving device is configured to receive power from the elevator in order to move grain received from a second auger in a second direction along a device path, within a device housing, to an outlet of the device housing. Grain moved along the device path to the outlet of the device housing passes through the outlet of the device housing to a second location on the elevator path that is upstream of the first location on the elevator path, with respect to the first direction.

In certain embodiments, the first auger may be rotated by rotational power received from the elevator. The second auger may be rotated by rotational power received from the elevator via the grain-moving device.

In certain embodiments, the elevator includes, within the elevator housing, upper and lower wheels, a flexible member seated on the upper and lower wheels to transmit power between the upper and lower wheels, and a plurality of transport members supported by the flexible member. During operation of the elevator, the upper wheel may receive rotational power from a power source to move the flexible member, such that the flexible member rotates the lower wheel and moves the transport members in the first direction along the elevator path. The upper or lower wheel may include a pulley or sprocket, the flexible member may include a belt or chain, and the transport members may include a set of paddles or baskets. The second location on the elevator path may be disposed upstream of the lower wheel, with respect to the first direction. A rotational axis of the first auger may be coaxial with a rotational axis of the lower wheel, such that the first location on the elevator path is disposed proximate a circumference of the lower wheel.

In certain embodiments, the grain-moving device includes, within the device housing, first and second wheels, a flexible member seated on the first and second wheels to transmit power between the first and second wheels, and a plurality of transport members supported by the flexible member. During operation of the grain-moving device, the first wheel may receive rotational power from a power source, via the elevator, to move the flexible member, such that the flexible member rotates the second wheel and moves the transport members in the second direction along the device path.

In certain embodiments, the elevator housing or the device housing may include an inclined surface extending, at least in part, between the device path and the second location on the elevator path, such that grain moving from the device path to the second location along the elevator path is moved by gravity, at least in part, along the inclined surface towards the elevator path.

In certain embodiments, the first auger may move grain into the elevator housing through a first elevator inlet opening that is disposed on a lateral side of the elevator housing, with respect to the agricultural combine. The grain-moving device may move grain into the elevator housing through a second elevator inlet opening that is disposed on one of a front side and a rear side of the elevator housing, with respect to the agricultural combine.

According to another aspect of the disclosure, an elevator may be configured to receive grain at a first location along an elevator path and move grain from the first location in a first direction along the elevator path to an offload location disposed at a first height above the first location. A grain-moving device may be configured to move grain along a device path in a second direction, different than the first direction, to a second location along the elevator path that is at a second height above the first location, wherein the second height is smaller than the first height. When the grain-moving arrangement receives operational power, the grain-moving device may move grain along the device path to the second location and the elevator may move grain from the first and second locations along the elevator path to the offload location.

In certain embodiments, a first auger may move grain from a first cleaning shoe to the first location along the elevator path. A second auger may move grain from a second cleaning shoe to the grain-moving device. The grain-moving device may receive power via the elevator to move grain along the device path.

In certain embodiments, the elevator may include upper and lower elevator wheels, an elevator flexible member seated on the upper and lower elevator wheels to transmit power between the upper and lower wheels, and a plurality of elevator transport members supported by the elevator flexible member. The grain-moving device may include a first device wheel, a second device wheel disposed farther from the elevator than the first device wheel, a device flexible member seated on the first and second device wheels to transmit power between the first and second device wheels, and a plurality of device transport members supported by the flexible member for moving grain along the device path. An axis of rotation of the lower elevator wheel may be disposed lower than an axis of rotation of the first device wheel, with respect to the agricultural combine.

In certain embodiments, an inclined surface may extend, at least in part, between the device path and the elevator path, such that grain passing from the grain-moving device to the second location along the elevator path is moved by gravity, at least in part, along the inclined surface towards the elevator path.

According to still another aspect of the disclosure, an elevator may be configured to receive grain at a first location along an elevator path and move grain from the first location in a first direction along the elevator path to an offload location. A grain-moving device may be configured to move grain along a device path in a second direction, different than the first direction, to a second location along the elevator path that is upstream of the first location, with respect to the first direction along the elevator path. When the grain-moving arrangement receives operational power, the grain-moving device may move grain along the device path to the second location and the elevator may move grain from the first and second locations along the elevator path to the offload location.

In certain embodiments, a first auger may move grain from a first cleaning shoe to the first location along the elevator path. A second auger may move grain from a second cleaning shoe to the grain-moving device. The grain-moving device may receive power via the elevator to move grain along the device path.

In certain embodiments, one or more transport members of the elevator may move grain towards the offload location along the transport portion of the elevator path and move downward, at least in part, along the return portion of the elevator path. The second location along the elevator path may be disposed along the return portion of the elevator path.

In certain embodiments, the grain-moving device may receive power via the elevator to move grain along the device path.

In certain embodiments, an inclined surface may extend, at least in part, between the device path and the elevator path, such that grain passing from the grain-moving device to the second location along the elevator path is moved by gravity, at least in part, along the inclined surface towards the elevator path.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed grain-moving arrangement of an agricultural combine, as shown in the accompanying figures of the drawings described briefly above. Various modifications to the example embodiments may be contemplated by one of skill in the art.

The term "wheel," as used herein, means any sprocket, pulley, or similar component that is configured to receive or transmit rotational power. Rotational power may be received or transmitted by a wheel in a variety of ways. For example, rotational power may be received at a wheel via a shaft to which the wheel is mounted (or otherwise attached), via a meshing of teeth of the wheel with teeth of another wheel, via a belt seated on the wheel or a chain seated on teeth of the wheel, and so on. Likewise, rotational power may be transmitted by a wheel via a meshing of teeth of the wheel with teeth of another wheel, via a belt seated on the wheel or a chain seated on teeth of the wheel, via a rotational shaft to which the wheel is mounted (or otherwise attached), and so on.

The term "transport member," as used herein, means any member configured to engage a quantity of grain in order to move the grain along a path. In certain embodiments, a transport member may be configured as a basket or as a paddle, including a paddle with a flat blade, a curved blade, a scoop, or other design.

As noted above, it may be useful to move grain between various locations within a combine. For example, cleaned grain from a cleaning shoe may need to be moved upward (and, potentially, forward or rearward) for storage in a grain tank of the combine. The grain-moving arrangement disclosed herein may provide for generally improved movement of grain within a combine, including for combines with multiple cleaning shoes.

In certain embodiments, an elevator (e.g., a clean grain elevator) may extend from a location near the base of a combine toward a grain tank near the top of the combine. The elevator may include first and second wheels (e.g., pulleys, sprockets, and so on), with a flexible member (e.g., a belt, a chain, and so on) seated on the wheels, and a number of transport members (e.g., various paddles) supported by the flexible member. Power received at the first wheel (e.g., an upper wheel) may be transmitted to the second wheel (e.g., a lower wheel) by the flexible member, such that the first and second wheels rotate together and the flexible member carries the transport members in a looping path around the first and second wheels. In this way, using power received at the first wheel, the transport members may transport grain along an elevator path within a housing of the elevator. An elevator outlet opening in the elevator housing may be disposed along the elevator path, such that grain transported along the elevator path by the transport members may exit the elevator housing at the elevator outlet opening (e.g., for further transport toward the grain tank).

A first auger may be configured to transport grain along the first auger to a first inlet opening in the elevator housing. During operation, grain passing through the first inlet opening may be engaged by the transport members of the elevator, such that the grain is lifted within the housing. In certain embodiments, the first auger may be configured to transport cleaned grain to the elevator from a first cleaning shoe.

A grain-moving device may also be provided for moving grain from another location into the elevator housing. In certain embodiments, the grain-moving device may be configured to move grain within a housing of the grain-moving device in a similar manner to the elevator described above. For example, the grain-moving device may include first and second wheels (e.g., pulleys, sprockets, and so on), with a flexible member (e.g., a belt, a chain, and so on) seated on the wheels, and a number of transport members (e.g., various paddles) supported by the flexible member. Power received at the first wheel (e.g., a rear wheel, with respect to the combine) may be transmitted to the second wheel (e.g., a forward wheel, with respect to the combine) by the flexible member, such that the first and second wheels rotate together and the flexible member carries the transport members in a looping path around the first and second wheels.

The grain-moving device may be configured to receive grain from a second auger (e.g., at a location near the second wheel) and transport the grain along a device path through the device housing toward an outlet opening in the device housing. The outlet opening for the device housing and a second inlet opening for the elevator housing may be configured such that grain leaving the grain-moving device through the outlet opening of the device housing moves to the elevator through the second inlet of the elevator housing. Once the grain from the grain-moving device reaches the elevator, the grain may then be carried by the elevator transport members, along with grain from the first auger, along the elevator path (e.g., upward to the outlet opening of the elevator housing).

In certain embodiments, grain from the first auger may be moved into the elevator path (i.e., for lifting within the elevator) at a first location along the elevator path, and grain from the grain-moving device (i.e., from the second auger) may be moved into the elevator path at a second location along the elevator path that is upstream of the first location. In this way, for example, grain from both augers may be lifted by the elevator, but grain from the first auger may be prevented from moving into the grain-moving device, instead of moving along the elevator path towards the elevator outlet opening.

In certain embodiments, the transport members of the elevator may move grain upward along a lifting portion of the elevator path and may move downward, without moving grain, along a return portion of the elevator path. In such a configuration, for example, grain from the grain-moving device may be provided to the elevator path along the return portion of the elevator path.

In certain embodiments, an inclined surface may extend, at least in part, between the elevator path and the device path. With such a configuration, grain passing from the grain-moving device to the elevator may be moved along the inclined surface towards the elevator path by the force of gravity.

In certain embodiments, the grain-moving device may be powered via the elevator. For example, a first wheel of the elevator (e.g., an upper wheel) may receive rotational power from an engine (or other power source) of the combine. The rotational power at the first wheel may be transmitted to a second wheel of the elevator (e.g., a lower wheel) by a flexible member, such that rotation of the second wheel is powered by the engine via the first wheel. An intermediary flexible member may then transmit rotational power from the second wheel of the elevator to a first wheel of the grain-moving device (e.g., a rearward wheel). The flexible member of the grain-moving device may then transmit power from the first wheel of the grain-moving device to rotate a second wheel of the grain-moving device (e.g., a forward wheel), such that rotation of the first and wheels of the grain-moving device is powered by the engine via the elevator. In certain embodiments, intermediary wheels may be attached to the second wheel of the elevator and the first wheel of the grain-moving device. The intermediary flexible member may then be seated on the intermediary wheels in order to transmit rotational power between the driven wheel of the elevator and the drive wheel of the grain transport device. This may be useful, for example, in order to operate the grain-moving device at a different (e.g. lower) speed than the elevator, through the use of the intermediary wheels to transmit rotational power via a particular gear ratio.

Figure 1:
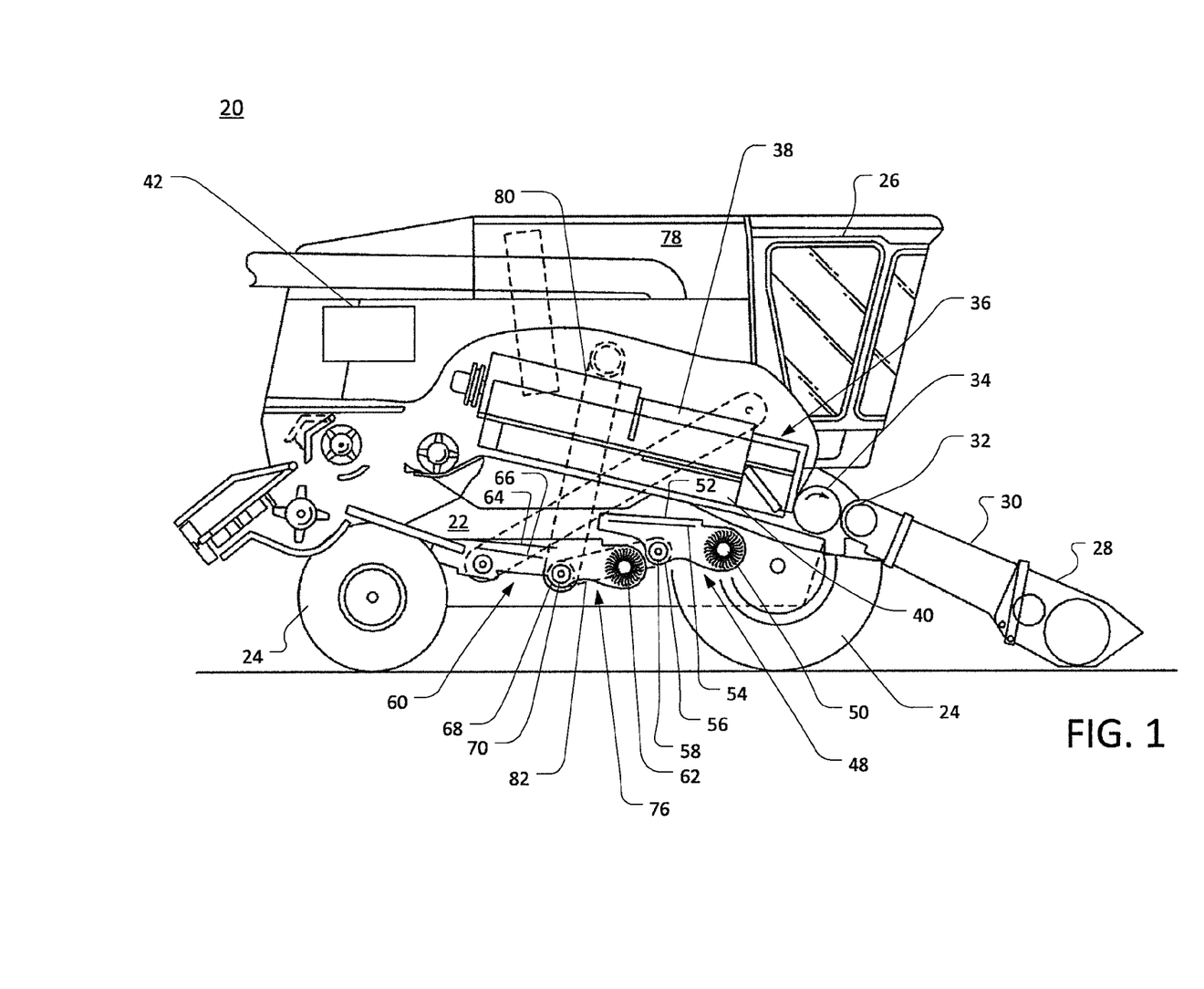
FIG. 1 is a side view of an example agricultural combine with two cleaning shoes and a grain-moving arrangement.
Figure 2:
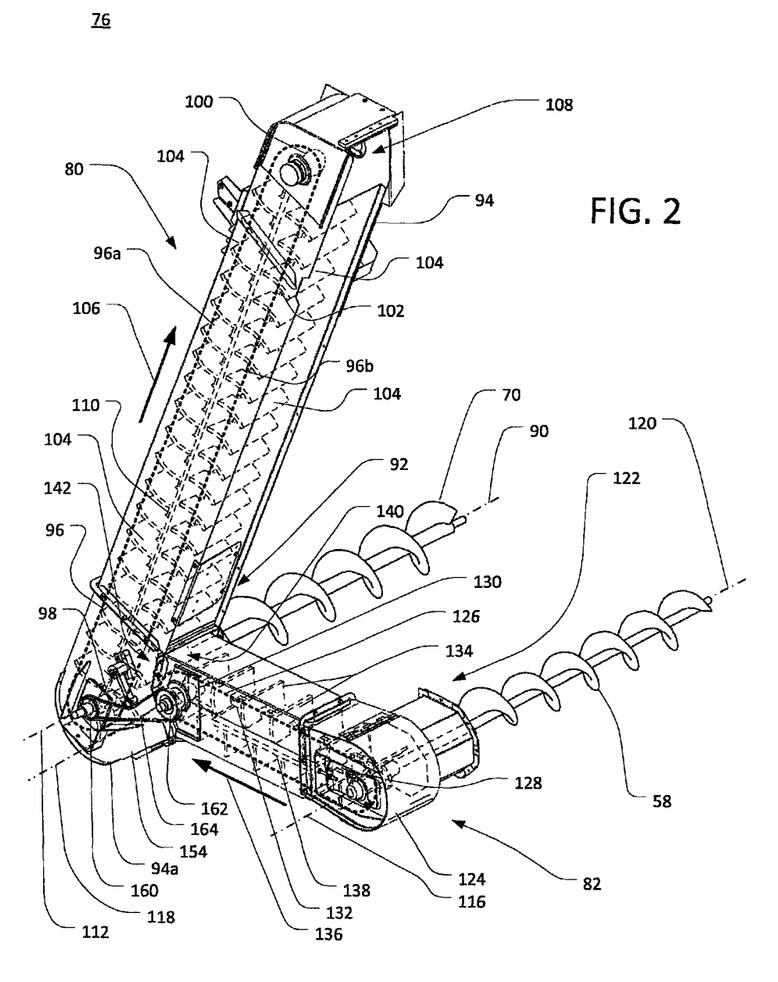
FIG. 2 is a perspective view of an example configuration of the grain-moving arrangement of FIG. 1, including various internal components.
Figure 3:
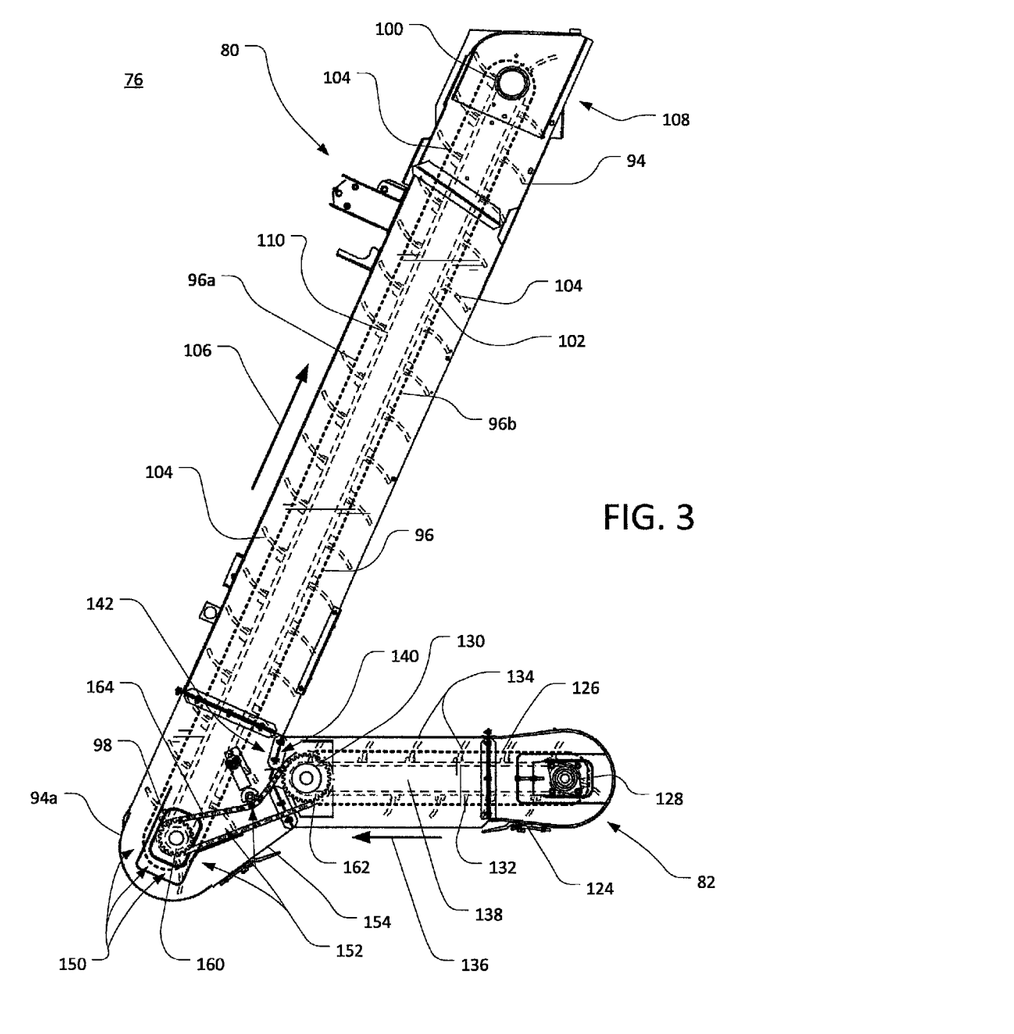
FIG. 3 is a side view of the example configuration of the grain-moving arrangement of FIG. 2.
Figure 4:
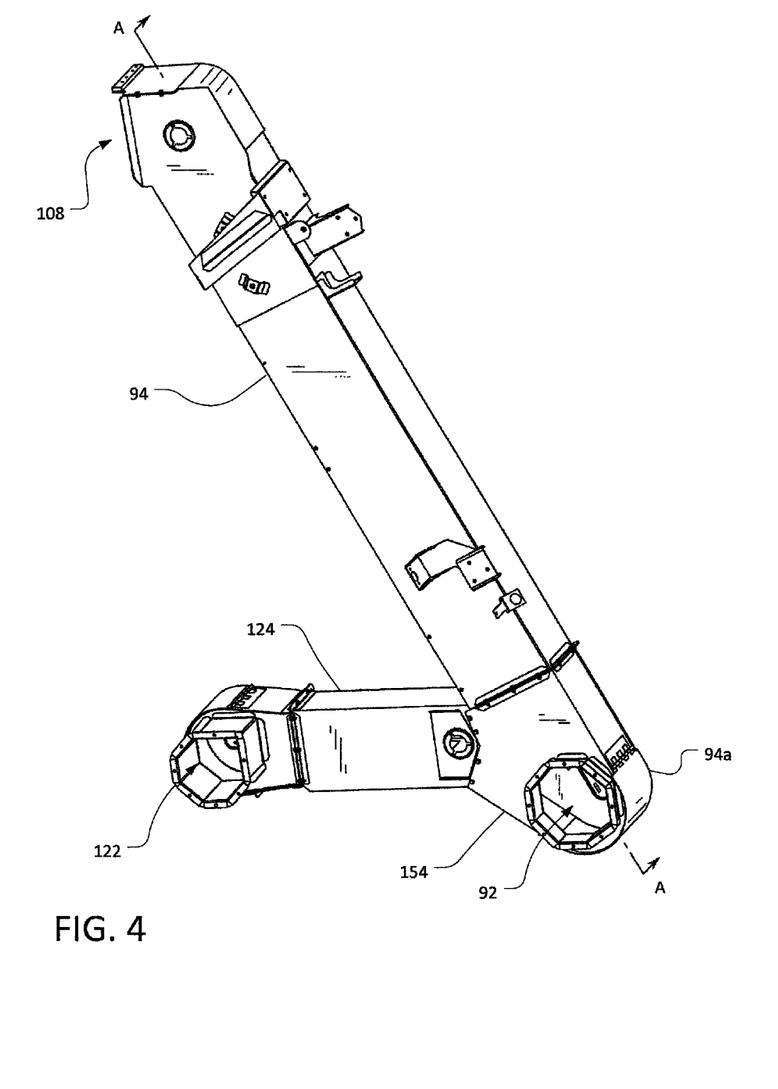
FIG. 4 is a perspective view of a housing structure of the example grain-moving arrangement of FIG. 2, taken from a generally opposite perspective than FIG. 2.
Figure 5:
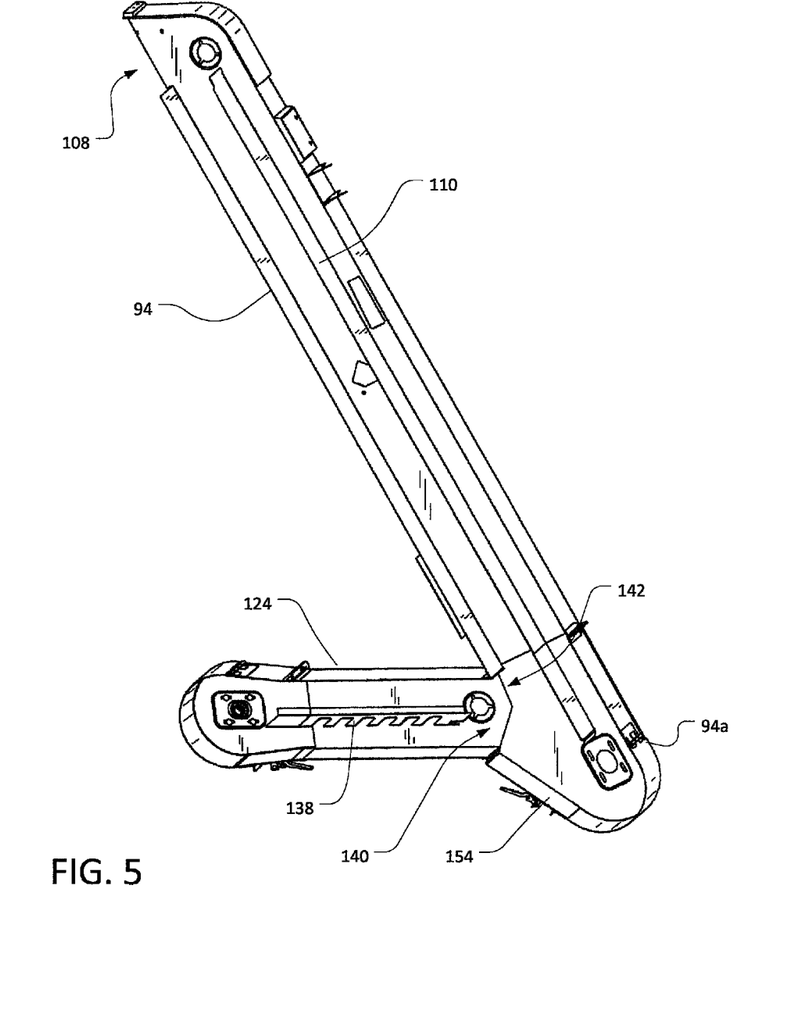
FIG. 5 is a cross-sectional view of the housing structure of FIG. 4, taken along a plane A-A of FIG. 4.

Referring now to FIG. 1, an example grain-moving arrangement may be implemented with respect to an example agricultural combine 20, or with respect to a variety of other agricultural combines. As used below, directional terms such as "front" or "forward" may refer to the forward direction of travel of combine 20, which is toward the left in FIG. 1. Likewise, directional terms such as "back," "rear," or "rearward" may refer to the reverse direction of travel of the combine, which is toward the right in FIG. 1. The terms "transverse", "lateral", "side-to-side" or the like may refer to a generally horizontal direction that is at a right angle to the forward (or rearward) direction.

As depicted in FIG. 1, the example agricultural combine 20 includes a chassis 22 with wheels 24. The wheels 24 are mounted to the chassis 22, and engage with the ground in order to propel the combine 20. A cab 26, also mounted to the chassis 22, houses an operator as well as various devices to control the combine 20. The wheels 24 and other devices of the combine 20 are powered by an internal combustion engine 42.

A header 28 is supported at the front of the combine 20 in order to cut and gather crop material from a field. The header 28 is supported by a feederhouse 30, which is pivotally mounted to the chassis at a mount 32. The feederhouse 30 may include, for example, an inclined conveyor (not shown) for transport of cut crop material from the header 28 into the body of the combine 20.

After passing over a guide drum 34 or feed accelerator, the crop material from the feederhouse 30 reaches an axially oriented threshing device 36. (Other embodiments may include laterally oriented or other threshing devices (not shown).) In the embodiment depicted, threshing device 36 includes a rotor 38, on which various threshing elements (not shown) are mounted. The rotor 38 rotates above a grated or sieved concave 40, such that crop material passing between the threshing elements and the concave 40 is separated, at least in part, into grain and chaff (or other non-grain material).

Grain and chaff passing through the concave 40 fall (or are actively fed) into a first cleaning shoe 48, for further cleaning. The cleaning shoe 48 includes a fan 50, for generating generally rearward air flow, as well as a sieve 52, and a chaffer 54. The sieve 52 and chaffer 54 are suspended with respect to the chassis 22 by pivot arms (not shown) and are connected, respectively, to rocker arms (not shown) mounted to disks (or other devices). As the fan 50 blows air across and through the sieve 52 and the chaffer 54, rotation of the disks (or movement of other devices) causes reciprocating motion of the sieve 52 and the chaffer 54, via movement of the rocker arms. The combination of this motion of the sieve 52 and the chaffer 54 with the air flow from the fan 50 generally causes the lighter chaff to be blown upward and rearward within the combine 20, while the heavier grain falls through the sieve 52 and the chaffer 54 and accumulates in a clean grain trough 56 near the base of the combine 20. An auger 58 within the trough 56 rotates to move the cleaned grain through the trough 56 towards the lateral side of the combine 20 (i.e., to the right side of the combine 20, in the embodiment depicted).

In certain embodiments, including as depicted, a second cleaning shoe 60 is also provided. The cleaning shoe 60 may be configured similarly to the cleaning shoe 48, with a fan 62, for generating generally rearward air flow, as well as a sieve 64, and a chaffer 66. The sieve 64 and chaffer 66 are suspended with respect to the chassis 22 by pivot arms (not shown) and are connected, respectively, to rocker arms (not shown) mounted to disks (or other devices). As the fan 62 blows air across and through the sieve 64 and the chaffer 66, rotation of the disks (or movement of other devices) causes reciprocating motion of the sieve 64 and the chaffer 66, via movement of the rocker arms. The combination of this motion of the sieve 64 and the chaffer 66 with the air flow from the fan 62 generally causes the lighter chaff to be blown upward and rearward within the combine 20, while the heavier grain falls through the sieve 64 and the chaffer 66 and accumulates in a clean grain trough 68 near the base of the combine 20. An auger 70 within the trough 68 rotates to move the cleaned grain through the trough 68 towards the lateral side of the combine 20 (i.e., to the right side of the combine 20, in the embodiment depicted).

An example grain-moving arrangement 76 for the combine 20, may be configured to receive separate streams of grain at separate locations in order to move the grain within the combine 20. As depicted, for example, the grain-moving arrangement 76 is configured to receive grain from the cleaning shoe 48 via the auger 58 and from the cleaning shoe 60 via the auger 70. Also as depicted, and as described in greater detail below, an elevator 80 of the arrangement 76 extends generally upward along the lateral side of the combine 20. The elevator 80 is configured to receive grain from the auger 70 at a lower end of the elevator portion 80, such that grain from the auger 70 may be lifted within the elevator portion 80 towards a grain tank 78 (or other location). Also as depicted, a grain-moving device 82 of the arrangement 76 extends generally forward from the elevator 80 towards the cleaning shoe 48, also along the lateral side of the combine 20. The device 82 is configured to receive grain from the auger 58 at a forward end of the grain-moving device 82, and move that grain from the auger 58 rearward along the lateral side of the combine 20 to the elevator 80. The grain may then lifted within the elevator 80, along with grain from the cleaning shoe 60 and the auger 70, towards the grain tank 78 (or other location). In this way, for example, grain from both of the cleaning shoes 48 and 60 may be moved to the grain tank 78 by the arrangement 76.

The example combine 20 described above includes the forward cleaning shoe 48 and the rearward cleaning shoe 60, which feeds clean grain to the arrangement 76 via augers 58 and 70. Accordingly, the grain-moving arrangement 76 may be described below with respect to generally rearward movement of grain from the cleaning shoe 48 by the device 82, and generally upward movement of grain from the cleaning shoe 60 and the cleaning shoe 48 by the elevator 80. It will be understood, however, that certain embodiments of a grain-moving arrangement may be utilized to move grain received from other devices or locations within the combine 20. In certain embodiments, a grain-moving arrangement may be utilized with combines (not shown) having only a single cleaning shoe. For example, in certain configurations, a combine may include only a single cleaning shoe, but two separate augers (or other devices) may gather grain from different locations on the combine. These augers (or other devices) may then operate with a grain-moving arrangement similarly to the operation of augers 58 and 70 with the arrangement 76, such that the grain-moving arrangement moves grain from both augers towards a common endpoint.

Referring also to FIGS. 2 through 5, various details of an example configuration of the grain-moving arrangement 76 are presented. It will be understood that the various mechanisms and structures depicted in these figures are presented as examples only, and that other configurations for various aspects of the grain-moving arrangement 76 (or other grain-moving arrangements) may be possible.

As noted above, the auger 70 may be configured to convey grain from the cleaning shoe 60 (or another device or location) into the elevator 80. In the embodiment depicted, the auger 70 rotates around an axis of rotation 90 in order to convey grain from the cleaning shoe 60 (see FIG. 1), to an inlet opening 92 in a housing 94 of the elevator 80. (For clarity, components relating to the elevator 80 may sometimes be prefaced, in this disclosure, by the term "elevator." For example, the housing 94 may sometimes be referred to as an "elevator" housing, and the inlet opening 92 may sometimes be referred to as an "elevator" inlet opening.) As depicted, the inlet opening 92 is disposed on a lateral side of the elevator housing 94, facing the body of the combine 20. It will be understood, however, that other configurations are possible.

Generally, the elevator may include an elevator mechanism to move the grain received at the inlet opening 92 (e.g., grain received from the cleaning shoe 60 via the auger 70) along a path 96. In the embodiment depicted, sprockets 98 and 100 (or other wheels) are disposed at opposite ends of the housing 94 and a chain 102 (or other flexible member) is seated on the sprockets 98 and 100 to transfer power between the sprockets 98 and 100. A series of paddles 104 (or other transport members) are supported by the chain 102, such that as the sprockets 98 and 100 rotate, the chain 102 is moved to drive the paddles 104 along the path 96 in a generally clockwise direction (from the perspective of FIGS. 2 and 3). In this way, grain received into the elevator housing 94 from the auger 70 through the inlet opening 92 may be moved by the paddles 104 along the a lifting portion 96a of the path 96 in the direction of arrow 106. At the top end of the elevator housing 94, an outlet opening 108 (or other offload location) is provided, such that grain lifted within the elevator 80 by the paddles 104 exits the elevator housing 94 through the outlet opening 108 (e.g., for lifting into the grain tank 78 by an additional device). After discharging the grain through the outlet opening 108, the paddles 104 may continue (i.e., as moved by the sprockets 98 and 100 and the chain 102) along a return portion 96b of the path 96. In certain embodiments, a divider 110 may be provided between lifting portion 96a and return portion 96b of the elevator path 96, such that grain being moved by the paddles 104 along the lifting portion 96a of the path 96 (i.e., in the direction of the arrow 106) may be prevented from crossing into the return portion 96b of the path 96 along the length of the divider 110.

In the embodiment depicted, the elevator 80 is configured to receive rotational power for operation of the elevator 80 (i.e., for transport of grain with the paddles 104 along the path 96) at the upper sprocket 100. For example, a belt or chain arrangement may link the sprocket 100 to the engine 42, such that rotational power from the engine drives operation of the elevator 80 via the sprocket 100.

In certain embodiments, the grain-moving arrangement 76 may be configured such that power received at the sprocket 100 (or a similar component of the elevator 80) may be utilized to power other operations of the arrangement 76. For example, in the embodiment depicted, the rotation of the auger 70 to move grain from the cleaning shoe 60 to the elevator 80 may be powered by rotation of the sprocket 98, which in turn is powered by rotation of the sprocket 100, via the chain 102. Also as depicted, the axis of rotation 90 of the auger 70 is disposed coaxially with an axis of rotation 112 of the sprocket 98 to facilitate this power-transfer arrangement. In certain embodiments, the auger 70 (or a shaft extending coaxially therefrom) may be connected directly to the sprocket 98, such that rotation of the sprocket 98 (e.g., as driven by rotational power received at the sprocket 100) directly drives rotation of the auger 70. Other configurations may be possible, including configurations in which a speed reduction (e.g., via a particular gear ratio) is imposed between the sprocket 98 (or other component of the elevator 80) and the auger 70.

Also as noted above, the auger 58 may be configured to convey grain from the cleaning shoe 48 (or another device or location) into the grain-moving device 82. In the embodiment depicted, the auger 58 rotates around an axis of rotation 120 in order to convey grain from the cleaning shoe 48 (see FIG. 1), to an inlet opening 122 in a housing 124 of the grain-moving device 82. (For clarity, components relating to the device 82 may sometimes be prefaced, in this disclosure, by the term "device." For example, the housing 124 may sometimes be referred to as a "device" housing, and the inlet opening 122 may sometimes be referred to as a "device" inlet opening.) As depicted, the inlet opening 122 is disposed on a lateral side of the device housing 124, facing the body of the combine 20. It will be understood, however, that other configurations are possible.

Generally, the device 82 may include a grain-moving mechanism to move the grain received at the inlet opening 122 (e.g., grain received from the cleaning shoe 48 via the auger 58) along a path 126. In the embodiment depicted, sprockets 128 and 130 (or other wheels) are disposed at opposite ends of the housing 124 and a chain 132 (or other flexible member) is seated on the sprockets 128 and 130 to transfer power between the sprockets 128 and 130. A series of paddles 134 (or other transport members) are supported by the chain 132, such that as the sprockets 128 and 130 rotate (i.e., about axes of rotation 116 and 118, respectively), the chain 132 is moved to drive the paddles 134 along the path 126 in a generally clockwise direction (from the perspective of FIGS. 2 and 3). In this way, grain received into the device housing 124 from the auger 58 through the inlet opening 122 may be moved by the paddles 134 along the bottom portion of the housing 124 (and the path 126) in the direction of arrow 136. After rounding the sprocket 130, the paddles 134 may then continue along an upper portion of the housing 124 (and the path 126) to return to the sprocket 128. In certain embodiments, a divider 138 may be provided between upper and lower portions of the housing 124, such that grain being moved by the paddles 134 in the direction of arrow 136 (i.e., along the bottom portion of the path 126, in a clockwise direction) may be prevented from crossing into the upper portion of the housing 124 along the length of the divider 138.

In order to facilitate transfer of grain from the grain-moving device 82 (and, thereby, from the auger 58) to the elevator 80, the device housing 124 may be connected to elevator housing 94 in various ways. As depicted, for example, a rearward end (i.e., left-side, from the perspective of FIGS. 2 and 3) of the device housing 124 is connected to a lower end of the elevator housing 94, with a portion 94a of the elevator housing 94 extending somewhat below the device housing 124. It will be understood, however, that other configurations are possible.

In order for grain moved by the paddles 134 to be transferred into the elevator housing 94 for lifting towards the elevator outlet opening 108 (and the grain tank 78), an outlet opening 140 is provided in the device housing 124. A corresponding inlet opening 142 is also provided in the elevator housing 94, with the inlet opening 142 and the outlet opening 140 being generally aligned such that grain moving out of the device housing 124 through the outlet opening 140 moves into the elevator housing 94 through the inlet opening 142. In certain embodiments, including as depicted, the elevator housing 94 may be attached to the device housing 124 to form a single housing structure 144 (see, e.g., FIGS. 4 and 5). In certain embodiments, such a housing structure (e.g., the housing structure 144) may be configured such that the elevator inlet opening 142 overlaps with the device outlet opening 140 (i.e., such that the openings 140 and 142 cover, at least in part, the same area). It will be understood, however, that other configurations are possible.

Generally, it may be useful to move grain from the grain-moving device 82 into the elevator path 96 (i.e., for lifting towards the elevator outlet opening 94) at a different location than grain from the auger 70 is moved into the elevator path 96. For example, in order to avoid grain from the auger 70 being gathered by the paddles 134 and moved into the upper portion of the grain-moving device 82, it may be useful to dispose the device outlet opening 140 (and the elevator inlet opening 142) upstream of the elevator inlet opening 92, with respect to the normal direction of grain movement along the elevator path 96. In the embodiment depicted, the elevator inlet opening 92 for receiving grain from the auger 70 is proximate the sprocket 98, such that grain from the auger 70 is moved into the elevator path 96 at locations 150 (see, e.g., FIG. 3) that are also generally proximate the sprocket 98. As such, it may be useful to dispose the device outlet opening 140 (and the elevator inlet opening 142) generally above the sprocket 98, along the return portion 96b of the elevator path 96. Grain from the grain-moving device 82 may thereby be moved into the elevator path 96 for transport by the paddles 104 at locations 152 (see, e.g., FIG. 3) that are generally upstream of the locations 150. In this way, grain from the grain-moving device 124 (and, thereby, from the auger 58) and grain from the auger 70 may be moved by the paddles 104 towards the elevator outlet opening 108, with reduced risk of the adverse effects such as the jamming of the grain-moving device 82 with grain from the auger 70.

As depicted, the various locations 152 are also disposed at various heights above the locations 150, between the locations 150 (with respect to the combine) and the outlet opening 108. As such, grain entering the elevator path 96 at the locations 152 may move generally downward towards the locations 150, and grain at the locations 150 (i.e., grain from the grain-moving device 82 and the auger 70) may move generally upwards towards the outlet opening 108.

Also as depicted, the device outlet opening 140 is disposed on a generally rearward side of the device housing 124 and the elevator inlet opening 142 is disposed on a generally forward side of the elevator housing 94. It will be understood that other configurations may be possible. For example, where the auger 58 (or another similar mechanism) is disposed on the combine 20 rearward of the elevator 80, the grain-moving device 82 may be configured to move grain forward along the lateral side of the combine 20 (i.e., rather than rearward, as depicted in the various figures). In such a configuration, an outlet opening for the device housing 124 may be disposed on a forward side of the device housing 124 and an inlet opening for the elevator housing 94 may be disposed on a rearward side of the elevator housing 94. Similarly, in other embodiments, an outlet opening for the device housing 124 may alternatively (or additionally) be disposed on a top or bottom side of the housing 124, with a corresponding disposition of an inlet opening for the elevator housing 94.

In certain embodiments, additional features may be provided to assist in moving grain from the grain-moving device 82 into the elevator 80 for lifting by the elevator 80 towards the elevator outlet opening 108. In the embodiment depicted, for example, the elevator housing 94 includes an inclined surface 154 (i.e., inclined with respect to ground) extending from the elevator inlet opening 142 (and the device outlet opening 140) towards the lower portion 94a of the elevator housing 94. Accordingly, as grain is moved through the elevator inlet opening 142 (and the device outlet opening 140) by the paddles 134, gravitational force may urge the grain along the inclined surface 154 and thereby assist in moving the grain from the device path 126 to the elevator path 96, for further transport. It will be understood that other configurations are possible. For example, a different inclined surface may be included as part of the device housing 124, or as a component that is distinct from either of the housings 124 and 94. Likewise, although the example inclined surface 154 is depicted as a generally straight surface, other inclined surfaces may exhibit curved profiles, compound slopes, or other geometry.

As noted above, in certain embodiments, the grain-moving arrangement 76 may be configured such that power received at the sprocket 100 (or a similar component of the elevator 80) may be utilized to power other operations of the arrangement 76. For example, in the embodiment depicted, power received at the elevator 80 may be utilized also to power the operation of the grain-moving device 82 and the auger 58. Still referring to FIGS. 2 and 3, an intermediary sprocket 160 (or other wheel) may be configured to co-rotate with the sprocket 98 of the elevator 80. For example, the sprocket 160 may be integrally formed with the sprocket 98, or may be coaxially mounted with the sprocket 98 such that both sprockets 98 and 160 rotate around the axis of rotation 112. Another intermediate sprocket 162 (or other wheel) may be configured to co-rotate with the sprocket 130 of the grain-moving device 82. For example, the sprocket 162 may be integrally formed with the sprocket 130, or may be coaxially mounted with the sprocket 130 such that both sprockets 130 and 162 rotate around the axis of rotation 118. Further, an intermediary chain 164 (or other flexible member) may be seated on the sprockets 160 and 162, such that the chain 164 may transmit rotational power between the sprockets 160 and 162. As such, when rotational power received at the upper elevator sprocket 100 causes the lower elevator sprocket 98 to rotate, the sprockets 160 and 162 and the chain 164 may cause the device sprocket 130 also to rotate. This rotation of the sprocket 130, via the chain 132, may cause the sprocket 128 to rotate and thereby operate the grain-moving device 82.

In certain embodiments, the sprockets 160 and 162 may be configured with different sizes from each other or from the sprockets 98 and 130, respectively, such that a difference in rotational speed is effected between the elevator sprocket 98 and the device sprocket 130. This may be useful, for example, if different amounts of grain are to be moved by the elevator 80 and the grain-moving device 82 (or by the auger 70 and the auger 58), such that different operating speeds may be appropriate among the various mechanisms.

In certain embodiments, the rotation of the auger 58 to move grain from the cleaning shoe 48 to the grain-moving device 82 may be powered by rotation of the sprocket 128, which in turn may be powered by rotation of the sprocket 130, via the chain 102. In the embodiment depicted, the axis of rotation 120 of the auger 58 is disposed coaxially with the axis of rotation 116 of the sprocket 98 to facilitate this power-transfer arrangement. In certain embodiments, the auger 58 (or a shaft extending coaxially therefrom) may be connected directly to the sprocket 128, such that rotation of the sprocket 128 (e.g., as driven by rotational power received at the sprocket 130 from the elevator 80) directly drives rotation of the auger 58. Other configurations may be possible, including configurations in which a speed reduction (e.g., via a particular gear ratio) is imposed between the sprocket 128 (or other component of the grain-moving device 82) and the auger 58.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, components, operations, or arrangements, but do not preclude the presence or addition of one or more other features, components, operations or arrangements.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A grain-moving arrangement (76) for an agricultural combine (20), the grain-moving arrangement comprising:
   a first cleaning shoe (60);
   a second cleaning shoe (48);
   a first auger (70) configured to rotate to move grain received from the first cleaning shoe along the first auger;
   a second auger (58) configured to rotate to move grain received from the second cleaning shoe along the second auger;

an elevator (80) configured to move grain in a first direction (106) along an elevator path (96), within an elevator housing (94), to an outlet (108) of the elevator housing, and further configured to receive grain from the first auger, for movement along the elevator path, at a first location (150) on the elevator path, wherein the elevator includes, within the elevator housing, upper and lower wheels (100, 98), a flexible member (102) seated on the upper and lower wheels to transmit power between the upper and lower wheels, and a plurality of transport members (104) supported by the flexible member;

a grain-moving device (82) configured to receive power from the elevator in order to move grain received from the second auger in a second direction (136) along a device path (126), within a device housing, to an outlet (140) of the device housing, wherein grain moved along the device path to the outlet of the device housing passes through the outlet of the device housing to a second location (152) on the elevator path that is upstream of the first location on the elevator path, with respect to the first direction;

wherein, when the elevator receives operational power, the grain-moving device moves grain from the second auger to the elevator, and the elevator moves grain from the grain-moving device and the first auger along the elevator path to the outlet of the elevator housing;

wherein, during operation of the elevator, the upper wheel receives rotational power from a power source (42) to move the flexible member, such that the flexible member rotates the lower wheel and moves the transport members in the first direction along the elevator path; and wherein the first auger is rotated by rotational power received from the elevator, and a rotational axis (90) of the first auger is coaxial with a rotational axis of the lower wheel (112) such that the first location on the elevator path is disposed proximate a circumference of the lower wheel.

2. The grain-moving arrangement of claim 1, wherein the second auger is rotated by rotational power received from the elevator via the grain-moving device.

3. The grain-moving arrangement of claim 1, wherein one or more of the upper and lower wheels includes one or more of a pulley and a sprocket;
wherein the flexible member includes, respectively, one or more of a belt and a chain; and
wherein the plurality of transport members includes one or more of a set of paddles and a set of baskets.

4. The grain-moving arrangement of claim 1, wherein the second location on the elevator path is disposed upstream of the lower wheel, with respect to the first direction.

5. The grain-moving arrangement of claim 1, wherein the grain-moving device includes, within the device housing, a first wheel (130), a second wheel (128) disposed farther from the elevator than the first wheel, a flexible member (132) seated on the first and second wheels to transmit power between the first and second wheels, and a plurality of transport members (134) supported by the flexible member; and
wherein, during operation of the grain-moving device, the first wheel receives rotational power from a power source, via the elevator, to move the flexible member, such that the flexible member rotates the second wheel and moves the transport members in the second direction along the device path.

6. The grain-moving arrangement of claim 1, wherein one or more of the elevator housing and the device housing includes an inclined surface (154) extending, at least in part, between the device path and the elevator path, such that grain moving from the device path to the second location along the elevator path is moved by gravity, at least in part, along the inclined surface towards the elevator path.

7. The grain-moving arrangement of claim 1, wherein the first auger moves grain into the elevator housing through a first elevator inlet opening (92) that is disposed on a lateral side of the elevator housing, with respect to the agricultural combine, and the grain-moving device moves grain into the elevator housing through a second elevator inlet opening (142) that is disposed on one of a front side and a rear side of the elevator housing, with respect to the agricultural combine.

8. A grain-moving arrangement (76) for an agricultural combine (20), the grain-moving arrangement comprising:
a first auger (70) configured to rotate to move grain;
a second auger (58) configured to rotate to move grain;
an elevator (80) configured to receive grain from the first auger at a first location (150) along an elevator path (96) and move grain from the first location in a first direction (106) along the elevator path to an offload location (108) disposed at a first height above the first location, wherein the elevator includes, upper and lower elevator wheels (100, 98), an elevator flexible member (102) seated on the upper and lower elevator wheels to transmit power between the upper and lower elevator wheels, and a plurality of elevator transport members (104) supported by the elevator flexible member for moving grain along the elevator path; and
a grain-moving device (82) configured receive grain from the second auger and to move grain along a device path (126) in a second direction (136), different than the first direction, to a second location (152) along the elevator path that is at a second height above the first location, wherein the second height is smaller than the first height;
wherein, when the grain-moving arrangement receives operational power, the grain-moving device moves grain along the device path towards the second location along the elevator path, and the elevator moves grain along the elevator path from the first and second locations to the offload location;
wherein the upper wheel receives rotational power from a power source (42) to move the flexible member, such that the flexible member rotates the lower wheel and moves the transport members in the first direction along the elevator path; and
wherein the first auger is rotated by rotational power received from the elevator, and a rotational axis (90) of the first auger is coaxial with a rotational axis of the lower wheel (112) such that the first location on the elevator path is disposed proximate a circumference of the lower wheel.

9. The grain-moving arrangement of claim 8, further comprising:
first and second cleaning shoes (60, 48) included in the agricultural combine;
wherein the first auger moves grain from the first cleaning shoe to the first location along the elevator path; and
wherein the second auger moves grain from the second cleaning shoe to the grain-moving device.

10. The grain-moving arrangement of claim 8, wherein the grain-moving device includes a first device wheel (130), a second device wheel (128) disposed farther from the elevator than the first device wheel, a device flexible member (132) seated on the first and second device wheels to transmit power between the first and second device wheels, and a plurality of device transport members (134) supported by the flexible member for moving grain along the device path; and wherein an axis of rotation (112) of the lower elevator wheel is disposed lower than an axis of rotation (118) of the first device wheel, with respect to the agricultural combine.

11. The grain-moving arrangement of claim 8, wherein the grain-moving device receives power via the elevator to move grain along the device path.

12. The grain-moving arrangement of claim 8, further comprising:
an inclined surface (154) extending, at least in part, between the device path and the elevator path, such that grain moving from the device path to the second location along the elevator path is moved by gravity, at least in part, along the inclined surface towards the elevator path.

13. A grain-moving arrangement (76) for an agricultural combine (20), the grain-moving arrangement comprising:
a first auger (70) configured to rotate to move grain;
a second auger (58) configured to rotate to move grain;
an elevator (80) configured to receive grain from the first auger at a first location (150) along an elevator path (96) and move grain from the first location in a first direction (106) along the elevator path to an offload location (108), wherein the elevator includes, upper and lower elevator wheels (100, 98), an elevator flexible member (102) seated on the upper and lower elevator wheels to transmit power between the upper and lower elevator wheels, and a plurality of elevator transport members (104) supported by the elevator flexible member for moving grain along the elevator path; and
a grain-moving device (82) configured to receive grain from the second auger and to move grain along a device path (126) in a second direction (136) different than the first direction to a second location (152) along the elevator path that is upstream of the first location, with respect to the first direction along the elevator path;

wherein, when the grain-moving arrangement receives operational power, the grain-moving device moves grain along the device path towards the second location along the elevator path and the elevator moves grain along the elevator path from the first and second locations to the offload location;

wherein the upper wheel receives rotational power from a power source (42) to move the flexible member, such that the flexible member rotates the lower wheel and moves the transport members in the first direction along the elevator path; and wherein the first auger is rotated by rotational power received from the elevator, and a rotational axis (90) of the first auger is coaxial with a rotational axis of the lower wheel (112) such that the first location on the elevator path is disposed proximate a circumference of the lower wheel.

14. The grain-moving arrangement of claim 13, further comprising:
first and second cleaning shoes (60, 48) included in the agricultural combine;
wherein the first auger moves grain from the first cleaning shoe to the first location along the elevator path; and
wherein the second auger moves grain from the second cleaning shoe to the grain-moving device.

15. The grain-moving arrangement of claim 13, wherein the grain-moving device receives power via the elevator to move grain along the device path.

16. The grain-moving arrangement of claim 13, further comprising:
an inclined surface (154) extending, at least in part, between the device path and the elevator path, such that grain moving from the device path to the second location along the elevator path is moved by gravity, at least in part, along the inclined surface towards the elevator path.

\* \* \* \* \*